April 7, 1931. H. T. JOHNSON 1,799,751
ALMOND SIZING AND SEPARATING MACHINE
Filed March 7, 1928 4 Sheets-Sheet 1
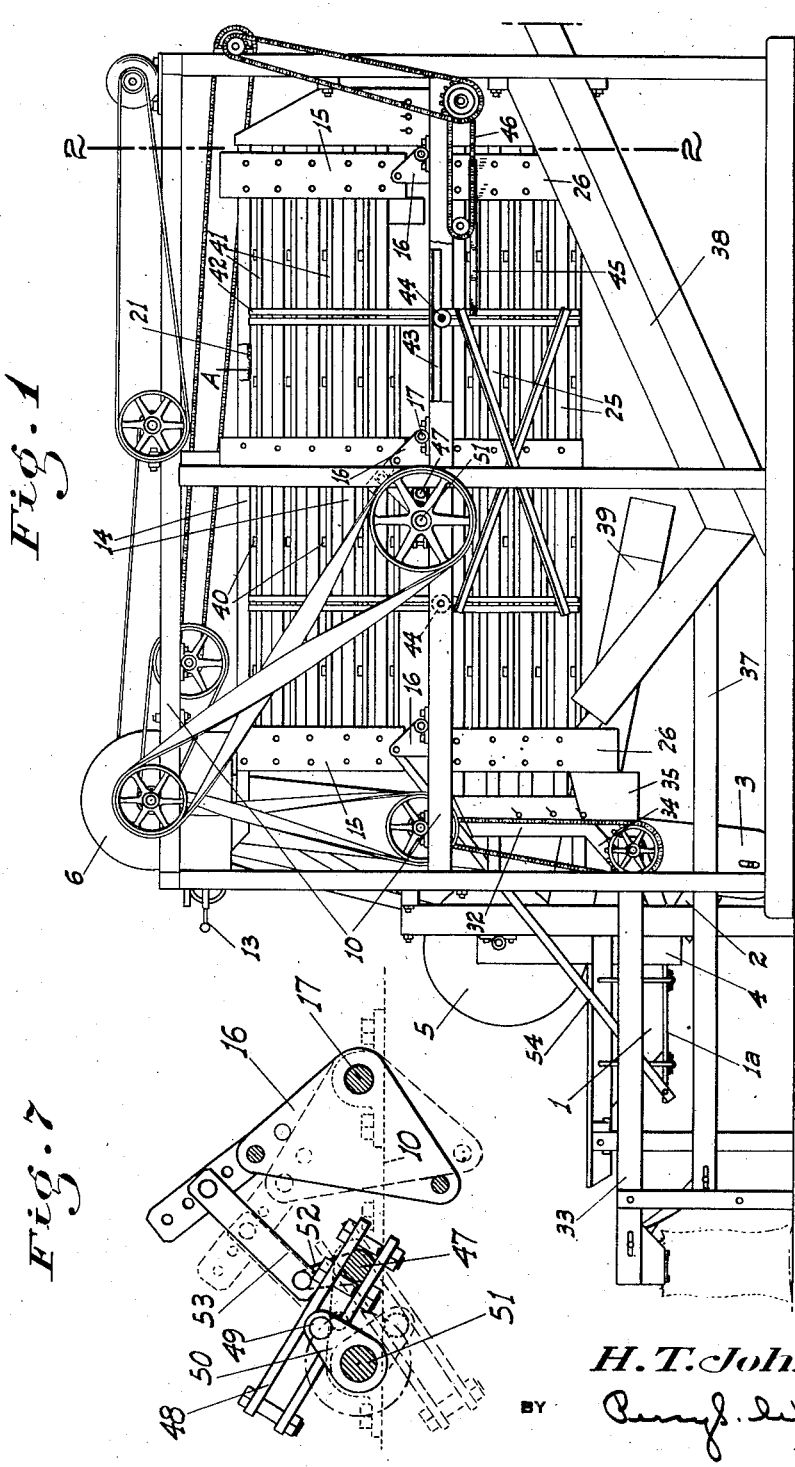
INVENTOR
H. T. Johnson
BY
ATTORNEY

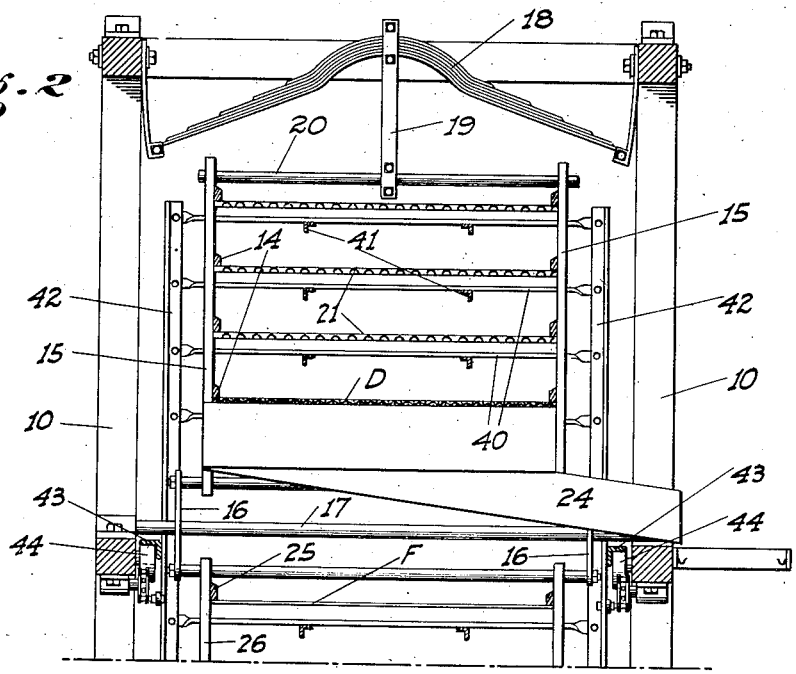
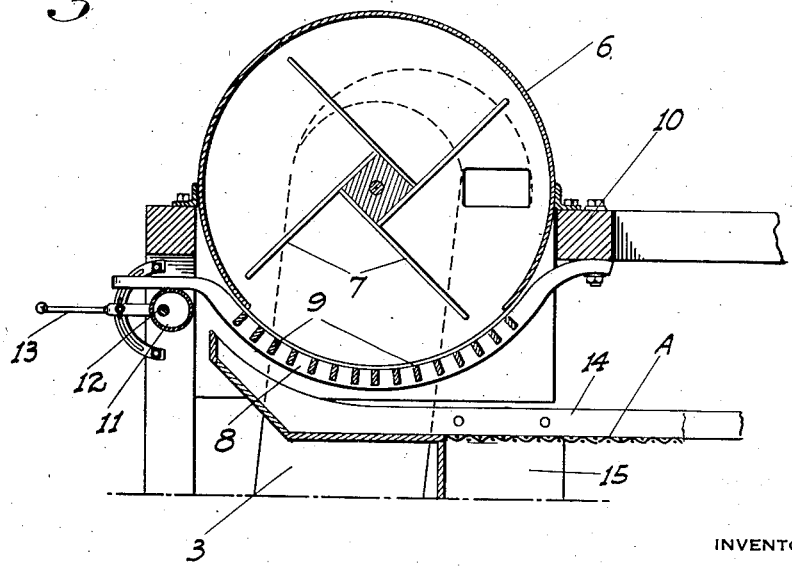

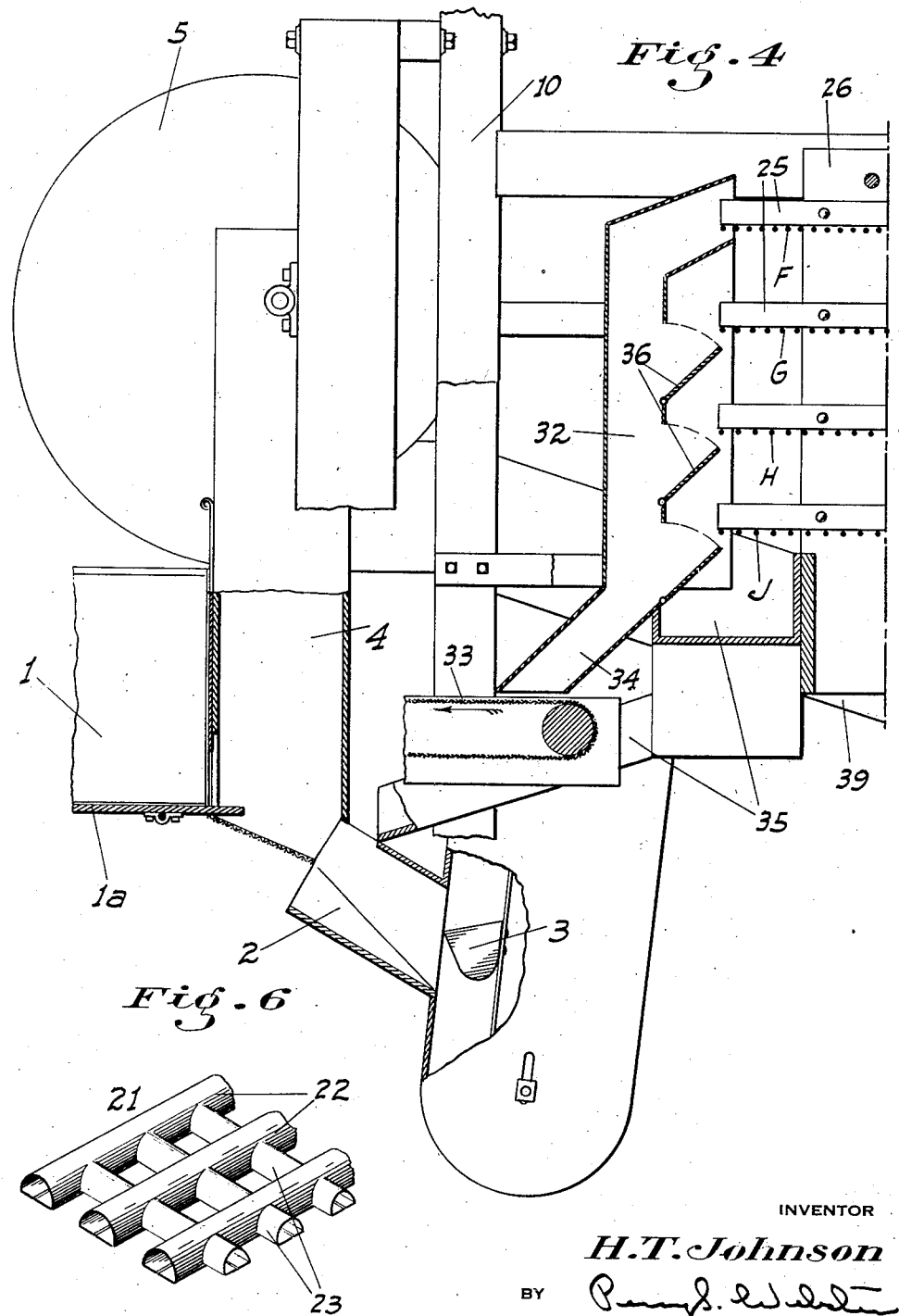

April 7, 1931.  H. T. JOHNSON  1,799,751
ALMOND SIZING AND SEPARATING MACHINE
Filed March 7, 1928   4 Sheets-Sheet 4

INVENTOR
H. T. Johnson
BY
ATTORNEY

Patented Apr. 7, 1931

1,799,751

UNITED STATES PATENT OFFICE

HALBERT T. JOHNSON, OF PASO ROBLES, CALIFORNIA

ALMOND SIZING AND SEPARATING MACHINE

Application filed March 7, 1928. Serial No. 259,812.

This invention relates to almond treating apparatus, my principal object being to provide a machine for hulling the nuts, sizing the various nuts as hulled, and subsequently separating the hulled nuts from the hulls. In connection with the carrying out of the above operations I have, I believe, provided a novel form of screen, a novel mechanism for shaking the screens, and a novel combination of sizing and separating screens arranged in a very compact form and with means operable at will for selectively controlling the passage of the nuts from one screen to another of the different sets.

These objects I accomplish by means of such structure and relative arrangement of parts as will fully appear by a perusal of the following specification and claims.

In the drawings similar characters of reference indicate corresponding parts in the several views:

Fig. 1 is a side elevation of the complete apparatus.

Fig. 2 is a fragmentary cross section taken on the line 2—2 of Fig. 1.

Fig. 3 is a sectional elevation of the hulling mechanism.

Fig. 4 is a fragmentary enlarged sectional elevation of the feed-in and final discharge mechanism of the apparatus.

Fig. 6 is a fragmentary perspective of a special form of screen.

Fig. 7 is a side elevation of a screen shaking mechanism.

Figure 5:
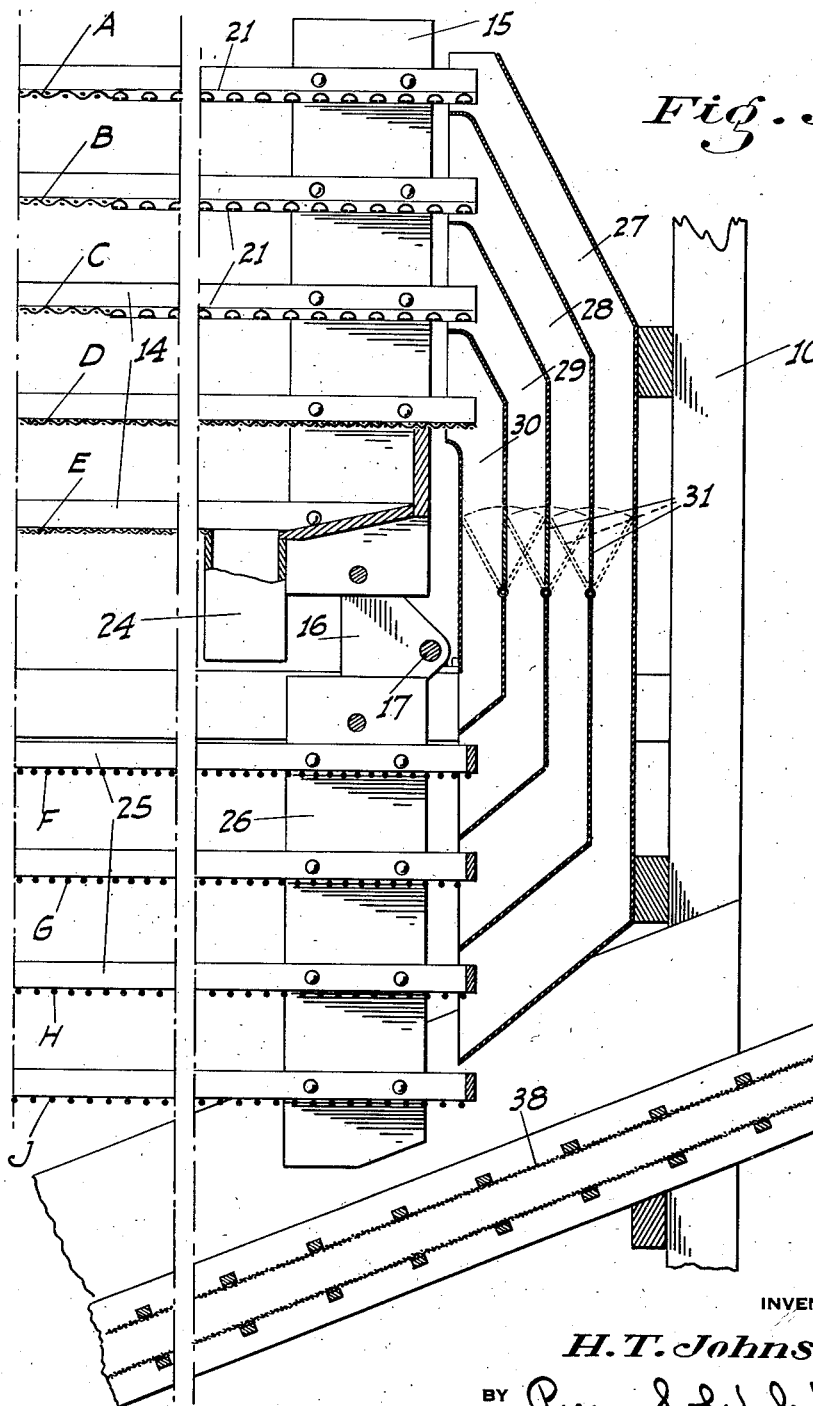
Fig. 5 is a fragmentary longitudinal section of the sizing and separating screen units, showing the arrangement of the connecting passages therebetween.

Referring now more particularly to the characters of reference on the drawings, the apparatus comprises a feed-in hopper 1 discharging into a chute 2 which communicates with an elevator 3; the vertical intake passage 4 of a suction fan 5 being interposed between the hopper and elevator and located so that the nuts moving along the chute will pass across the bottom of the passage 4, which is screened on the bottom as shown in Fig. 4. The elevator at its upper end discharges into a huller which comprises a cylindrical casing 6 in which a number of rotary beaters 7 are mounted. The bottom of the casing is formed of transversely spaced and circularly curved bars 8 which support a number of circumferentially spaced slats 9. These bars at one end are flexibly supported from the frame work 10 of the machine, while at the other end said bars rest on a roller 11 which is mounted on an eccentric shaft 12. The rotation of this roller is controlled by a hand operated lever 13 and it will therefore be seen that upon turning the roller one way or the other the adjacent ends of the bars will be raised or lowered and consequently the spacing of the slats 9 from the outer ends of the beaters 7 will be correspondingly altered to suit different sizes and varieties of nuts being hulled.

The nuts when hulled pass between the slats 9 and drop onto the topmost one of a series of horizontal and vertically spaced screen trays 14, of which there are preferably five. The trays are connected as a rigid unit by side plates 15 which are pivotally supported on brackets 16 secured to transverse shafts 17 journaled on the frame 10, the shafts 17 being rearwardly of the pivotal connection of the plates with the brackets. Additional yieldable supporting means for the screen units is provided in the form of a transversely extending inverted semi-elliptical spring 18 which is mounted on the frame 10 above the screens and connected thereto by a centrally disposed depending strap 19 which engages a cross shaft 20 extending between the upper ends of the adjacent plates 15 (see Fig. 2).

The screen trays from the uppermost one down are provided with screens of gradually decreasing square mesh as indicated at A, B, C, D, and E. Toward their discharge ends (which are those farthest from the huller) the screens of the three upper trays are of special form as indicated at 21. This special screen comprises longitudinally extending and transversely spaced hollow and substantially semicircular bars 22, which are intersected by similar transversely extending and longitudinally spaced bars 23. The bars are disposed so that their upper surfaces are substantially on the same level and with their curved surfaces uppermost; the space between the different sets of bars being such as to leave square openings equal in size to the square opening in the wire mesh adjacent. By reason of this arrangement of the bars, which have no flat surfaces or sharp edges, long flat nuts which may have bridged across the openings in the adjacent square wire mesh will have their major axes tilted vertically and their minor axes directed diagonally into the square openings and a closer sizing will result. Adjacent its rear end the lower screen E discharges into a transversely extending chute 24 which projects to one side of the machine so that the material in said chute may be caught in a box or sack.

Disposed below and in parallel relation to the upper screen unit is a separating screen unit comprising a plurality of vertically spaced screen trays 25 (of which there are one less than the upper screens) which trays are also connected together as a rigid unit by side plates 26. These plates are pivotally supported by the brackets 16, the pivotal connections of the plates 15 and 26 with said brackets being in common vertical alinement. The trays 25 are covered from end to end with transverse rods or wires the spacing of which increases from top to bottom as indicated at F, G, H, and J. The four upper screens of the upper sizing unit are connected at their discharge or rear ends with the adjacent ends of the lower screen unit, but in the reverse order, by vertical passages 27, 28, 29 and 30 respectively, which are fixed as a single unit on the frame 10. In other words the passage 27 connects the screens A and J; the passage 26 connects the screens B and H, and so on, so that the produce rejected by the largest mesh screen of the upper unit will be discharged onto the widest bar opening of the lower unit, the produce rejected by the next smaller sized square mesh will fall on the screen with the next smaller sized bar openings and so on. The spacing of the bars on screen J is slightly less than the least thickness of any nut which would be rejected by screen A, and the bar spacings of screens H, G, and F, are similarly proportioned to the products from B, C, and D, respectively, giving in this way the maximum opportunity for hulls and foreign matter to drop through the bars. To deflect the products from one passage to another if desired, however, so that the discharge from an upper screen may be made onto a different screen of the lower unit, the transversely extending division walls between the passages are provided with vertical deflecting gates 31, which may be swung longitudinally one way or the other as indicated in Fig. 5. The products may therefore be diverted from one passage into another during their travel between the screens as will be evident.

The lower screen units discharge at their forward ends into a vertical chute 32 which at its lower end is branched so as to discharge on to an ordinary picking table 33 as indicated at 34, or back into the feed-in chute 2 as shown at 35. The chute 32 above the branches is provided with vertical and transversely extending deflecting gates 36, one for each screen, which may be individually adjusted in a predetermined order so as to cause the products from the different screens to pass on to the picking table or back, to the chute 2 to be again run through the machine. A hull draper 37 extending under the picking table discharges onto a main hull draper 38 extending across and lengthwise of the lower screen unit under the same, the discharge pipe 39 from the fan 5 also discharging onto the draper 38.

The screen units are kept from being clogged by means of transverse and longitudinally spaced bars 40 passing under the different screens and supported from longitudinal beams 41 which are connected to side uprights 42. These uprights are connected to longitudinal rails 43 which ride on rollers 44 fixed on the main frame 10. This structure is reciprocated by means of a horizontal arm 45 connected at one end to one upright and at the other end to a link of an endless driven chain 46.

The screens are reciprocated by a specially designed mechanism as follows: Mounted on the frame 10 a short distance ahead of one of the brackets 16 is a transverse shaft 47 on which is clamped a radially slotted guide member 48. A pin 49 rides in this member, the pin being mounted on a crank arm 50 which is fixed on a transverse driven shaft 51 disposed a short distance ahead of the shaft 47. The shaft 47 has a forwardly sloping crank arm 52 thereon, from the outer end of which a link 53 connects with the adjacent bracket 16. This particular arrangement gives the link and bracket an upward and rearward movement during only a 120° rotative movement of the shaft 51, and a downward and forward movement during the remaining 240° of rotation of the shaft. The upper screen will therefore be raised quickly toward the discharge end and retracted at a relatively slow speed. This imparts a quick rearward movement to the nuts on the screen, while a relatively slow forward movement of the screen gives the nuts plenty of time to fall through the openings in the screens. Since the lower screen unit is also mounted on the brackets 16, it has the same movement as the upper unit; and since the direction of travel of the produce on the lower screens is opposite from that on the upper, such shaking movement of the lower screens functions to the same end as on the upper ones.

In order to agitate the nuts in the feed-in hopper 1 to possibly prevent them from jamming, the bottom 1a of the hopper is slidable and is connected by a link 54 to the forward bracket 16 as shown in Fig. 1.

In operation the nuts as fed into the hopper and passing to the elevator are immediately subjected to the action of the fan 5 which removes all relatively light material, such as leaves and twigs, before the nuts reach the huller. After being hulled the nuts and hulls initially pass onto the topmost screen A. Owing to the size of the topmost screen only the very largest nuts and hulls reach the rear end thereof and discharge through the passage 27 onto the lowermost screen J which has the widest bar spacing. On this screen any hulls possibly remaining with the nuts will drop through the screen J and onto the hull draper, the nuts themselves passing to the chute 32 and thence to the picking table. Similarly everything but nuts and hulls of a secondary size will drop through the second screen B, the material remaining on the latter discharge through the passage 28 onto the corresponding sized screen H of the lower series. From this screen the hulls drop through and thence of course through the lower wider spaced bar screen below and onto the hull draper. The material dropping through the screen B is taken care of by the screens C and G in the same manner as described and so on. The screen D is of such small mesh that nothing will drop therethrough onto the screen E but any nut meats and very small hull particles which will drop through the screen E. The meats retained on the screen E will pass to the chute 24.

As before stated the gates 31 provide for the selective control of movement of the material from one screen to another, as may be determined by the operator to be necessary or desirable. Unhulled nuts being of greater diameter than hulled nuts, will naturally be found toward the bottom of the lower set of screens whereas the hulled nuts will be found toward the top. Suitable manipulation of gates 36 will divert hulled nuts to the picking table and return unhulled nuts to the huller for further treatment.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination, a sizing screen unit comprising a plurality of vertically spaced screens, of successively decreasing mesh from the top one down, a separating screen unit comprising a plurality of vertically spaced screens of successively increasing bar spacing from the top one down, and passage means between the corresponding screens of the two units, all at one end thereof.

2. A structure as in claim 1, with means provided with said passage means for enabling produce from any sizing screen to be diverted at will to a screen of the separating unit other than the one of corresponding mesh.

3. In combination, a sizing screen unit comprising a plurality of vertically spaced screens of successively decreasing mesh from the top one down, a separating screen unit comprising a plurality of vertically spaced bar screens of successively increasing bar spacing from the top one down, said separating unit being disposed directly under the sizing unit, and vertical passages into which the ends of the sizing screens discharge and which discharge onto the adjacent ends of the separating screens; said passages being arranged to connect screens of corresponding mesh.

4. A structure as in claim 3, with vertical deflecting gates in said passages arranged to permit produce dropping into any passage to be deflected into an adjacent passage.

5. In combination, a sizing screen unit comprising a plurality of vertically spaced screens of successively decreasing mesh from the top one down, a separating screen unit comprising a plurality of vertically spaced bar screens of successively increasing bar spacing from the top one down, and passage means arranged to provide communication between the discharge ends of the sizing screens and different one of the separating screens selectively.

In testimony whereof I affix my signature.

HALBERT T. JOHNSON.